US009774697B2

United States Patent
Li et al.

(10) Patent No.: US 9,774,697 B2
(45) Date of Patent: Sep. 26, 2017

(54) METHOD, APPARATUS, AND SYSTEM FOR PUSHING NOTIFICATION

(71) Applicant: HUAWEI TECHNOLOGIES CO., LTD., Shenzhen, Guangdong (CN)

(72) Inventors: Zijun Li, Shenzhen (CN); Ning Piao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 410 days.

(21) Appl. No.: 14/098,933

(22) Filed: Dec. 6, 2013

(65) Prior Publication Data

US 2014/0207916 A1 Jul. 24, 2014

Related U.S. Application Data

(63) Continuation of application No. PCT/CN2013/070735, filed on Jan. 18, 2013.

(51) Int. Cl.
G06F 15/16 (2006.01)
H04L 29/08 (2006.01)

(52) U.S. Cl.
CPC .................. H04L 67/26 (2013.01)

(58) Field of Classification Search
CPC ........................................ H04L 67/26
USPC ................................. 709/206, 219
See application file for complete search history.

(56) References Cited

U.S. PATENT DOCUMENTS

| 8,823,507 | B1* | 9/2014 | Touloumtzis | H04L 67/24 340/501 |
| 2003/0023690 | A1* | 1/2003 | Lohtia | H04L 12/587 709/206 |
| 2006/0274701 | A1* | 12/2006 | Albertsson | H04L 12/587 370/338 |

(Continued)

FOREIGN PATENT DOCUMENTS

| CN | 101026802 | 8/2007 |
| CN | 101471992 A | 7/2009 |

(Continued)

OTHER PUBLICATIONS

International Search Report issued Oct. 31, 2013, in corresponding International Patent Application No. PCT/CN2013/070735.

(Continued)

*Primary Examiner* — Wing F Chan
*Assistant Examiner* — Joseph Maniwang
(74) *Attorney, Agent, or Firm* — Staas & Halsey LLP

(57) ABSTRACT

Embodiments of the present invention provide a method, a notification server, a user equipment, and a system for pushing a notification, which can increase the flexibility of pushing a notification and improve user experience. The method includes: receiving a service message sent by an application server, where the service message includes: a service notification, a user attribute, and a first application identifier; obtaining a terminal state level table according to the first application identifier and the user attribute; screening, according to the service message, the terminal state level table for n user equipments of which a terminal state level is greater than or equal to a preset state level, as a target user equipment; and sending the service notification to the target user equipment.

17 Claims, 8 Drawing Sheets

(56) References Cited

U.S. PATENT DOCUMENTS

| | | | |
|---|---|---|---|
| 2010/0067466 A1* | 3/2010 | Isonuma | H04W 48/10 370/329 |
| 2010/0075701 A1 | 3/2010 | Shang et al. | |
| 2010/0223328 A1* | 9/2010 | Haataja | H04L 67/26 709/203 |
| 2011/0145063 A1 | 6/2011 | Qureshi et al. | 705/14.52 |
| 2012/0101952 A1 | 4/2012 | Raleigh et al. | |
| 2013/0198293 A1* | 8/2013 | Parthasarathy | H04L 51/043 709/206 |
| 2014/0025758 A1* | 1/2014 | Glowacki | H04L 12/1895 709/206 |
| 2014/0047019 A1* | 2/2014 | Midtun | H04L 51/043 709/204 |
| 2014/0074907 A1* | 3/2014 | Soliman | H04W 28/14 709/203 |

FOREIGN PATENT DOCUMENTS

| | | |
|---|---|---|
| CN | 102047638 A | 5/2011 |
| CN | 102355632 | 2/2012 |
| CN | 102480517 A | 5/2012 |
| EP | 2 254 309 A1 | 11/2010 |
| JP | 5151232 | 2/2013 |
| WO | WO 01/69387 A2 | 9/2001 |
| WO | WO2008015456 | 2/2008 |

OTHER PUBLICATIONS

Extended European Search Report issued May 2, 2016 in corresponding European Patent Application No. 13776403.1.

Office Action, dated Jan. 13, 2016, in corresponding Chinese Application No. 201380000263.6 (5 pp.).

* cited by examiner

METHOD, APPARATUS, AND SYSTEM FOR PUSHING NOTIFICATION

CROSS-REFERENCE TO RELATED APPLICATIONS

This application is a continuation of International Application No. PCT/CN2013/070735, filed on Jan. 18, 2013, which is hereby incorporated by reference in their entireties.

TECHNICAL FIELD

Embodiments of the present invention relate to the field of communications, and in particular, to a method, an apparatus, and a system for pushing a notification.

BACKGROUND

With the widespread application of smart phones, tablet computers, notebook computers, intelligent glasses, smart watches, and so on, people are surrounded by increasingly more intelligent user equipments. At the same time, corresponding applications are rapidly increasing. Therefore, for a great number of applications, a notification needs to be pushed to a user with the help of a push (PUSH) service, so as to proactively bring new information relevant to an application to the user, thereby adding an association between the application and the user. Because a specification of each device varies, and an applicable occasion also varies, a condition of using a device or an application by people also varies.

In the prior art, if a user installs the same application on multiple user equipments, two main methods for pushing a notification exist: one is that, the user can log in to the same application only on one user equipment at the same moment, and a notification server can send a notification only to a user equipment on which the application is in a login state; and the other one is that, the user can log in to the same application on multiple user equipments at the same moment, and a notification server pushes a notification to each user equipment on which the application is in a login state. However, the application being in the login state does not mean that the user is using the application, and an objective of sending a notification by a corresponding server is to enable the user to see the notification. The foregoing method for pushing a notification may make the user miss seeing or repeatedly see the pushed notification; therefore, the flexibility of pushing a notification is low and user experience is poor.

SUMMARY

Embodiments of the present invention provide a method, a notification server, a user equipment, and a system for pushing a notification, which can increase the flexibility of pushing a notification and improve user experience.

To achieve the above, the present invention adopts the following technical solutions:

In a first aspect, a method for pushing a notification is provided, which includes:

receiving a service message sent by an application server, where the service message includes: a service notification, a user attribute, and a first application identifier;

obtaining a terminal state level table according to the first application identifier and the user attribute, where the terminal state level table is used to indicate a level used by the application in each user equipment;

screening, according to the service message, the terminal state level table for n user equipments of which a terminal state level is greater than or equal to a preset state level, as a target user equipment, where the n is an integer greater than or equal to 1; and sending the service notification to the target user equipment.

With reference to the first aspect, in a first implementable manner, before the obtaining a terminal state level table according to the first application identifier and the user attribute, the method further includes:

receiving a state change notification sent by each user equipment; and establishing the terminal state level table according to the state change notification.

With reference to the first implementable manner, in a second implementable manner, the screening, according to the service message, the terminal state level table for n user equipments of which a terminal state level is greater than or equal to a preset state level, as a target user equipment includes:

screening a user identifier table for the user identifier corresponding to the first application identifier;

screening a user indicated by the user identifier for a user satisfying the user attribute;

screening, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screening the terminal state level table for n user equipments of which a terminal state level is greater than or equal to the preset state level among the specific user equipments, as the target user equipment.

With reference to the first implementable manner, in a third implementable manner, the service message further includes: a second user identifier; and the screening, according to the service message, the terminal state level table for n user equipments of which a terminal state level is greater than or equal to a preset state level, as a target user equipment includes:

screening a user equipment identifier table for all specific user equipments corresponding to the second user identifier, where the specific user equipment is a device on which the application is installed among a user equipment indicated by the second user identifier; and screening the terminal state level table for n user equipments of which a terminal state level is greater than or equal to the preset state level among the specific user equipments, as the target user equipment.

With reference to the second or third implementable manner, in a fourth implementable manner, before the screening, according to the service message, the terminal state level table for n user equipments of which a terminal state level is greater than or equal to a preset state level, as a target user equipment, the method further includes:

obtaining the user identifier table, where the user identifier table records correspondence between an application identifier and a user identifier; and obtaining the user equipment identifier table, where the user equipment identifier table records correspondence between a user identifier and a user equipment identifier, where the user identifier table and the user equipment identifier table are used to screen the terminal state level table for the specific user equipments.

With reference to the fourth implementable manner, in a fifth implementable manner, the obtaining the user identifier table includes:

receiving the user identifier table sent by the application server; and the obtaining the user equipment identifier table includes:

receiving the user equipment identifier table sent by the application server.

With reference to the fourth implementable manner, in a sixth implementable manner, the obtaining the user equipment identifier table includes:

receiving registration information sent by each user equipment, where the registration information includes: a user identifier and a user attribute;

obtaining a user equipment identifier of the user equipment; and establishing the user equipment identifier table according to the user identifier, the user attribute, and the user equipment identifier.

In a second aspect, a method for pushing a notification is provided, which includes:

detecting whether a terminal state of a user equipment is changed;

sending a state change notification to a notification server when the terminal state is changed, so that the notification server establishes a terminal state level table according to the state change notification, where the terminal state level table is used to indicate a level used by an application in the user equipment.

With reference to the second aspect, in a first implementable manner, the method further includes:

receiving a service notification sent by the notification server, where the service notification is sent by the notification server after screening, according to a service message, the terminal state level table for n user equipments of which a terminal state level is greater than or equal to a preset state level, as a target user equipment, where the n is an integer greater than or equal to 1.

With reference to the second aspect or the first implementable manner, in a second implementable manner, the method further includes:

sending registration information to the notification server, where the registration information includes: a user identifier and a user attribute, so that the notification server establishes a user equipment identifier table according to the user identifier, the user attribute, and an obtained user equipment identifier.

In a third aspect, a notification server is provided, which includes:

a first receiving unit, configured to receive a service message sent by an application server, where the service message includes: a service notification, a user attribute, and a first application identifier, and send the service message to a first obtaining unit, a screening unit, and a sending unit;

the first obtaining unit, configured to receive the service message sent by the first receiving unit, obtain a terminal state level table according to the first application identifier and the user attribute, where the terminal state level table is used to indicate a level used by the application in each user equipment, and send the terminal state level table to the screening unit;

the screening unit, configured to receive the service message sent by the first receiving unit and the terminal state level table sent by the first obtaining unit, screen, according to the service message, the terminal state level table for n user equipments of which a terminal state level is greater than or equal to a preset state level, as a target user equipment, where the n is an integer greater than or equal to 1, and send the target user equipment to the sending unit; and the sending unit, configured to receive the service message sent by the first receiving unit and the target user equipment sent by the screening unit, and send the service notification to the target user equipment.

With reference to the third aspect, in a first implementable manner, the notification server further includes:

a second receiving unit, configured to receive a state change notification sent by each user equipment; and an establishment unit, configured to establish the terminal state level table according to the state change notification.

With reference to the first implementable manner, in a second implementable manner, the screening unit is specifically configured to:

screen a user identifier table for a user identifier corresponding to the first application identifier;

screen a user indicated by the user identifier for a user satisfying the user attribute;

screen, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screen the terminal state level table for n user equipments of which a terminal state level is greater than or equal to the preset state level among the specific user equipments, as the target user equipment.

With reference to the first implementable manner, in a third implementable manner, the service message further includes: a second user identifier; and the screening unit is specifically configured to:

screen a user equipment identifier table for all specific user equipments corresponding to the second user identifier, where the specific user equipment is a device on which the application is installed among a user equipment indicated by the second user identifier; and screen the terminal state level table for n user equipments of which a terminal state level is greater than or equal to the preset state level among the specific user equipments, as the target user equipment.

With reference to the second or third implementable manner, in a fourth implementable manner, the notification server further includes:

a second obtaining unit, configured to obtain the user identifier table, where the user identifier table records correspondence between an application identifier and a user identifier; and a third obtaining unit, configured to obtain the user equipment identifier table, where the user equipment identifier table records correspondence between a user identifier and a user equipment identifier, where the user identifier table and the user equipment identifier table are used to screen the terminal state level table for the specific user equipments.

With reference to the fourth implementable manner, in a fifth implementable manner, the second obtaining unit is specifically configured to:

receive the user identifier table sent by the application server; and the third obtaining unit is specifically configured to:

receive the user equipment identifier table sent by the application server.

With reference to the fourth implementable manner, in a sixth implementable manner, the third obtaining unit is specifically configured to:

receive registration information sent by each user equipment, where the registration information includes: a user identifier and a user attribute;

obtain a user equipment identifier of the user equipment; and establish the user equipment identifier table according to the user identifier, the user attribute, and the user equipment identifier.

In a fourth aspect, a user equipment is provided, which includes:

a detection unit, configured to detect whether a terminal state of the user equipment is changed; and a first sending unit, configured to send a state change notification to a notification server when the detection unit detects that the terminal state is changed, so that the notification server establishes a terminal state level table according to the state change notification, where the terminal state level table is used to indicate a level used by an application in the user equipment.

With reference to the fourth aspect, in a first implementable manner, the user equipment further includes:

a receiving unit, configured to receive a service notification sent by the notification server, where the service notification is sent by the notification server after screening, according to a service message, the terminal state level table for n user equipments of which a terminal state level is greater than or equal to a preset state level, as a target user equipment, where the n is an integer greater than or equal to 1.

With reference to the fourth aspect or the first implementable manner, in a second implementable manner, the user equipment further includes:

a second sending unit, configured to send registration information to the notification server, where the registration information includes: a user identifier and a user attribute, so that the notification server establishes a user equipment identifier table according to the user identifier, the user attribute, and an obtained user equipment identifier.

In a fifth aspect, a system for pushing a notification is provided, which includes:

any notification server described above;

any user equipment described above; and an application server, configured to send a service message to the notification server.

In a sixth aspect, a notification server is provided, which includes:

a receiver, configured to receive a service message sent by an application server, where the service message includes: a service notification, a user attribute, and a first application identifier;

a processor, configured to obtain a terminal state level table according to the first application identifier and the user attribute, where the terminal state level table is used to indicate a level used by the application in each user equipment, where the processor is further configured to screen, according to the service message, the terminal state level table for n user equipments of which a terminal state level is greater than or equal to a preset state level, as a target user equipment, where the n is an integer greater than or equal to 1; and a transmitter, configured to send the service notification to the target user equipment.

With reference to the sixth aspect, in a first implementable manner, the receiver is further configured to receive a state change notification sent by each user equipment; and the processor is further configured to establish the terminal state level table according to the state change notification.

With reference to the first implementable manner, in a second implementable manner, the processor is specifically configured to:

screen a user identifier table for a user identifier corresponding to the first application identifier;

screen a user indicated by the user identifier for a user satisfying the user attribute;

screen, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screen the terminal state level table for n user equipments of which a terminal state level is greater than or equal to the preset state level among the specific user equipments, as the target user equipment.

With reference to the first implementable manner, in a third implementable manner, the service message further includes: a second user identifier; and the processor is specifically configured to:

screen a user equipment identifier table for all specific user equipments corresponding to the second user identifier, where the specific user equipment is a device on which the application is installed among a user equipment indicated by the second user identifier; and screen the terminal state level table for n user equipments of which a terminal state level is greater than or equal to the preset state level among the specific user equipments, as the target user equipment.

With reference to the second or third implementable manner, in a fourth implementable manner, the receiver is further configured to obtain the user identifier table, where the user identifier table records correspondence between an application identifier and a user identifier; and the receiver is further configured to obtain the user equipment identifier table, where the user equipment identifier table records correspondence between a user identifier and a user equipment identifier, where the user identifier table and the user equipment identifier table are used to screen the terminal state level table for the specific user equipments.

With reference to the fourth implementable manner, in a fifth implementable manner, the receiver is specifically configured to:

receive the user identifier table sent by the application server; and receive the user equipment identifier table sent by the application server.

With reference to the fourth implementable manner, in a sixth implementable manner, the receiver is further configured to receive registration information sent by each user equipment, where the registration information includes: a user identifier and a user attribute; and the processor is further configured to obtain a user equipment identifier of the user equipment, and establish the user equipment identifier table according to the user identifier, the user attribute, and the user equipment identifier.

In a seventh aspect, a user equipment is provided, which includes:

a processor, configured to detect whether a terminal state of the user equipment is changed; and a transmitter, configured to send a state change notification to a notification server when the terminal state is changed, so that the notification server establishes a terminal state level table according to the state change notification, where the terminal state level table is used to indicate a level used by an application in the user equipment.

With reference to the seventh aspect, in a first implementable manner, the user equipment further includes:

a receiver, configured to receive a service notification sent by the notification server, where the service notification is sent by the notification server after screening, according to a service message, the terminal state level table for n user equipments of which a terminal state level is greater than or equal to a preset state level, as a target user equipment, where the n is an integer greater than or equal to 1.

With reference to the seventh aspect or the first implementable manner, in a second implementable manner, the transmitter is further configured to send registration information to the notification server, where the registration information includes: a user identifier and a user attribute, so that the notification server establishes a user equipment identifier table according to the user identifier, the user attribute, and an obtained user equipment identifier.

In an eighth aspect, a system for pushing a notification is provided, which includes:

any notification server described above;

any user equipment described above; and an application server, configured to send a service message to the notification server.

The present invention provides a method, a notification server, a user equipment, and a system for pushing a notification. The method for pushing a notification is applied to the notification server and includes: receiving a service message sent by an application server, where the service message includes: a service notification, a user attribute, and a first application identifier; obtaining a terminal state level table according to the first application identifier and the user attribute, where the terminal state level table is used to indicate a level used by an application in each user equipment; screening, according to the service message, the terminal state level table for n user equipments of which a terminal state level is greater than or equal to a preset state level, as a target user equipment, where the n is an integer greater than or equal to 1; and sending the service notification to the target user equipment. Because the notification server screens, according to the service message, the terminal state level table for the n user equipments of which the terminal state level is greater than or equal to the preset state level, as the target user equipment, a use activity degree of an application in a user equipment receiving the service notification is relatively high, and a probability that a user sees the service notification in real time is increased, thereby increasing the flexibility of pushing a notification and improving user experience.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
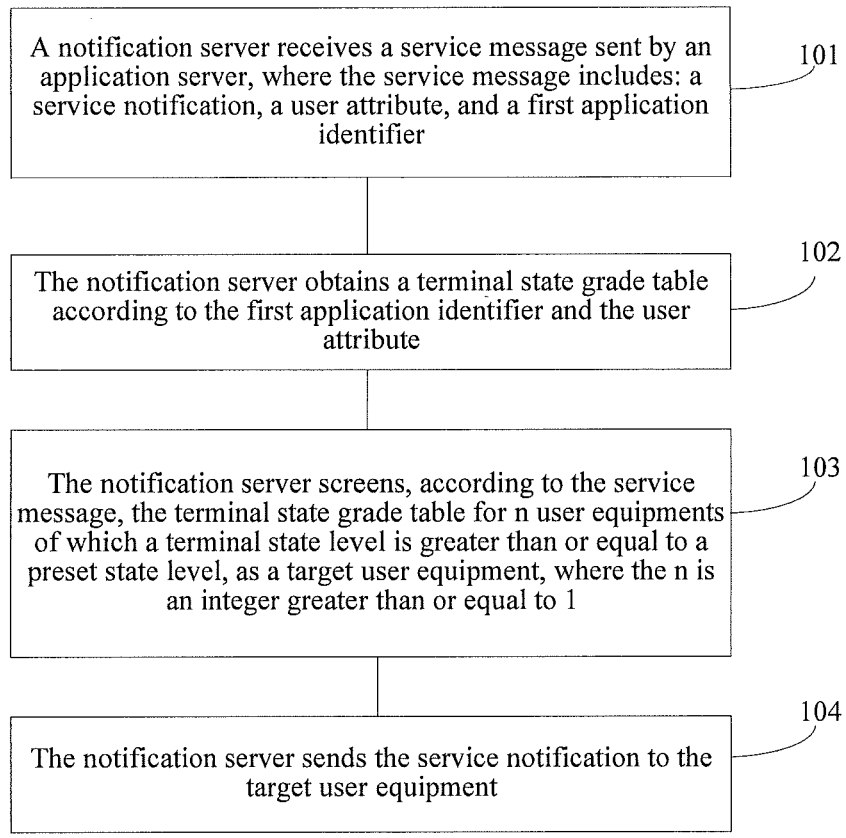
FIG. 1 is a flowchart of a method for pushing a notification according to an embodiment of the present invention.

As shown in FIG. 1, an embodiment of the present invention provides a method for pushing a notification, which includes:

101. A notification server receives a service message sent by an application server, where the service message includes: a service notification, a user attribute, and a first application identifier.

102. The notification server obtains a terminal state level table according to the first application identifier and the user attribute.

Before step 102, the notification server may receive a state change notification sent by each user equipment, and then establish the terminal state level table according to the state change notification. The terminal state level table is used to indicate a level used by an application in each user equipment.

103. The notification server screens, according to the service message, the terminal state level table for n user equipments of which a terminal state level is greater than or equal to a preset state level, as target user equipment, where n is an integer greater than or equal to 1.

Particularly, the service message may further include a specific user identifier and so on. The user identifier in the service message is used to indicate a target user that a service notification sent by the notification server would like to reach. In this embodiment of the present invention, it is assumed that the specific user identifier is a second user identifier, and at least one second user identifier exists.

The process of screening the terminal state level table for the target user equipment by the notification server may be relevant to content of the service message, and when content included in the service message varies, the process of screening for the target user equipment may be correspondingly adjusted. Specifically, when the service message includes: the first application identifier and the user attribute, the notification server may first screen a user identifier table for a user identifier corresponding to the first application identifier; then, screen a user indicated by the user identifier for a user satisfying the user attribute; then, screen, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and finally, screen the terminal state level table for n user equipments of which a terminal state level is greater than or equal to the preset state level among the specific user equipments, as the target user equipment.

When the service message includes: the first application identifier and the second user identifier, the notification server may first screen the user equipment identifier table for all specific user equipments corresponding to the second user identifier, where the specific user equipment is a device on which the application is installed among a user equipment indicated by the second user identifier; and finally, screen the terminal state level table for n user equipments of which a terminal state level is greater than or equal to the preset state level among the specific user equipments, as the target user equipment.

It should be noted that, when the service message includes: the first application identifier, the second user identifier, and the user attribute, because the second user identifier has clearly indicated the target user that the service notification would like to reach, the process of screening for a user according to the user attribute is not required, the notification server may correspondingly determine that a user attribute parameter is invalid, and reading of a corresponding parameter is not required.

104. The notification server sends the service notification to the target user equipment.

A notification server is added into a common system for pushing a notification, and when receiving a service message, the notification server screens a terminal state level table for n user equipments of which a terminal state level is greater than or equal to a preset state level, as a target user equipment, that is, a use activity degree of an application in the target user equipment is relatively high, and sends a corresponding service notification to the target user equipment, so that a probability that a user sees the service notification in real time is increased, thereby increasing the flexibility of pushing a notification and improving user experience.

Particularly, before step 103, the notification server needs to obtain the user identifier table and the user equipment identifier table, where the user identifier table records correspondence between an application identifier and a user identifier, and the user equipment identifier table records correspondence between a user identifier and a user equipment identifier, and the user identifier table and the user equipment identifier table are used to screen the terminal state level table for the specific user equipments.

In one aspect, the notification server may receive the user identifier table sent by the application server to obtain the user identifier table, and the notification server may also receive the user equipment identifier table sent by the application server to obtain the user equipment identifier table. In one aspect, the notification server may receive registration information sent by each user equipment, where the registration information includes: a user identifier and a user attribute; obtain a user equipment identifier of the user equipment; and establish the user equipment identifier table according to the user identifier, the user attribute, and the user equipment identifier.

Figure 2:
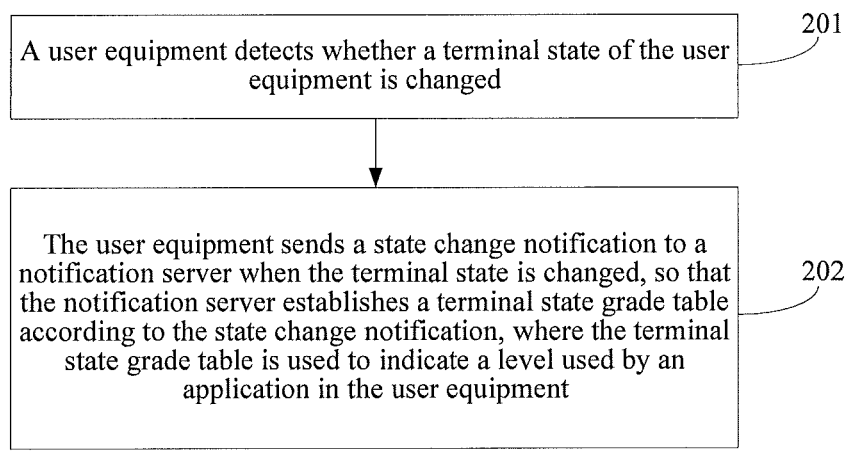
FIG. 2 is a flowchart of another method for pushing a notification according to an embodiment of the present invention.

As shown in FIG. 2, an embodiment of the present invention provides a method for pushing a notification, which includes:

201. A user equipment detects whether a terminal state of the user equipment is changed.

202. The user equipment sends a state change notification to a notification server when the terminal state is changed, so that the notification server establishes a terminal state level table according to the state change notification, where the terminal state level table is used to indicate a level used by an application in the user equipment.

The user equipment checks the terminal state and sends the state change notification to the notification server, so that the notification server can establish the terminal state level table according to the state change notification, and the notification server screens, according to a service message, the terminal state level table for n user equipments of which a terminal state level is greater than or equal to a preset state level, as a target user equipment; in this way, a use activity degree of an application in a user equipment receiving a service notification is relatively high, and a probability that a user sees the service notification in real time is increased, thereby increasing the flexibility of pushing a notification and improving user experience.

Furthermore, the method for pushing a notification that is provided in this embodiment of the present invention may further include: receiving, by the user equipment, a service notification sent by the notification server, where the service notification is sent by the notification server after screening, according to a service message, the terminal state level table for n user equipments of which a terminal state level is greater than or equal to a preset state level, as a target user equipment, where the n is an integer greater than or equal to 1.

The user equipment may send registration information to the notification server, where the registration information includes: a user identifier and a user attribute, so that the notification server establishes a user equipment identifier table according to the user identifier, the user attribute, and an obtained user equipment identifier.

Figure 3:
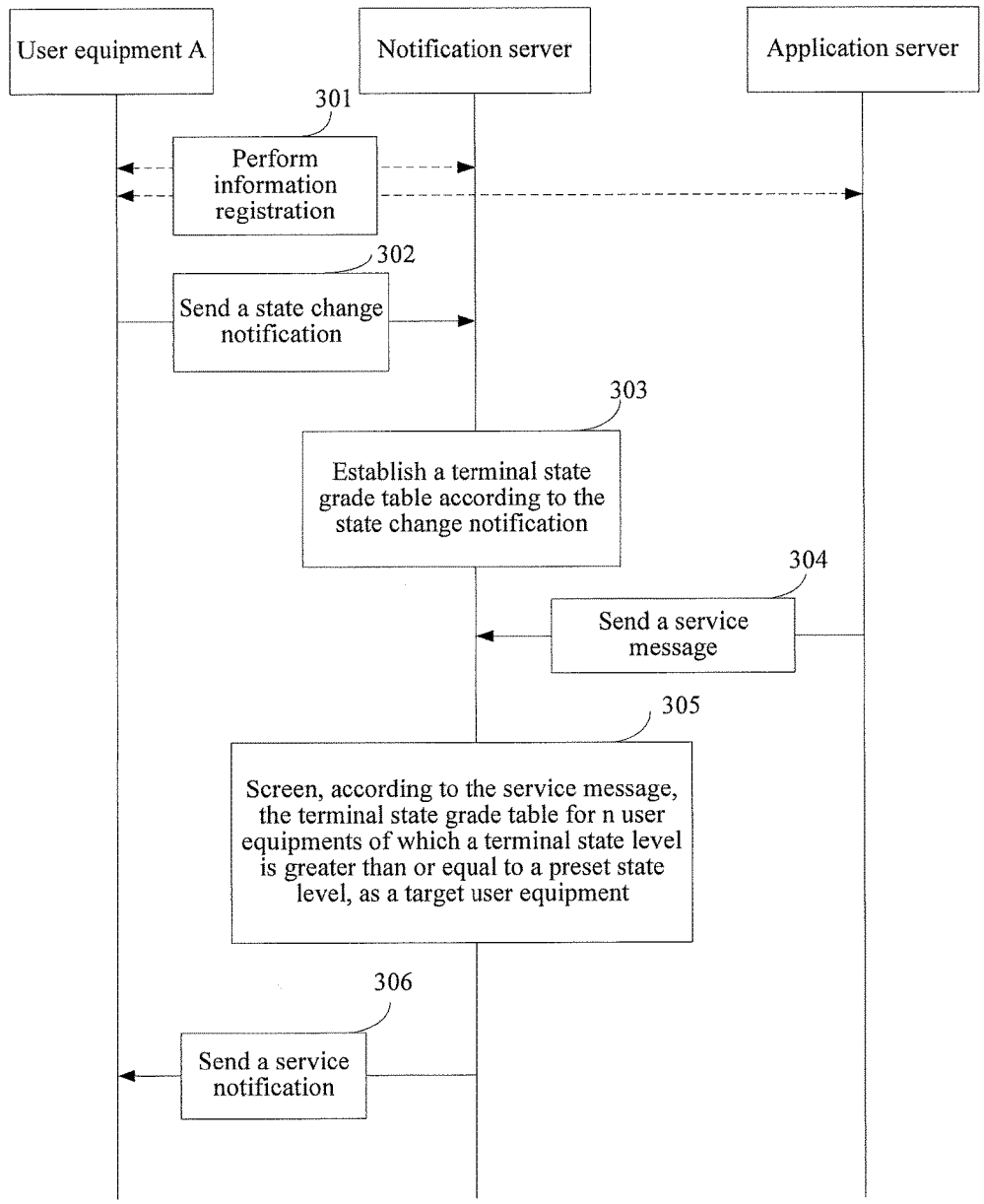
FIG. 3 is a flowchart of still another method for pushing a notification according to an embodiment of the present invention.

It should be noted that, a system for pushing a notification that is provided in an embodiment of the present invention specifically includes: a notification server, a user equipment, and an application server. Because multiple user equipments exist in the system for pushing a notification, in this embodiment, a user equipment A is taken as an example, and for an operation step of another user equipment, reference may be made to that of the user equipment A. As shown in FIG. 3, a specific method for pushing a notification that is provided in an embodiment of the present invention includes:

301. A user equipment A performs information registration.

In a practical application, when a user uses an application on a user equipment for the first time, information registration needs to be performed. In the registration process, a notification server may obtain a user identifier table, and may also obtain a user equipment identifier table. Methods for performing information registration by a user equipment that are provided in this embodiment of the present invention may be classified into two kinds:

One kind is that, the user equipment performs information registration on the notification server, and for a specific process, reference may be made to a common Oauth (open authorization) protocol. In the registration process, the user equipment may send registration information to the notification server, where the registration information includes: a user identifier and a user attribute, so that the notification server establishes the user equipment identifier table according to the user identifier, the user attribute, and an obtained user equipment identifier. Exemplarily, the user attribute may include the age of the user, a location of the user, a preference of the user, and so on. The notification server may provide a user interface in a form of a web page or the like for the user through the user equipment, so that the user correspondingly fills the user attribute, and at the same time, the user may also set a user identifier thereof, for example, a user name formed by a character and a letter, and so on, on the user interface. Particularly, a user identifier may also be allocated by the notification server to each user, and user identifiers of various users are different. When the notification server receives the registration information sent by the user equipment, the notification server may further correspondingly obtain a user equipment identifier of the user equipment, and establishes the user equipment identifier table according to the user identifier, the user attribute, and the obtained user equipment identifier. Exemplarily, the user equipment identifier table may be shown in table 1.

TABLE 1

| User Identifier | User Attribute 1 (Location) | User Attribute 2 (Gender) | User Equipment Identifier |
|---|---|---|---|
| U001 | Beijing | Male | D0001 |
|  |  |  | D0002 |
| U002 | Beijing | Male | D0003 |
|  |  |  | D0004 |
| U003 | Shanghai | Female | D0005 |
|  |  |  | D0006 |
|  |  |  | D0007 |

Table 1 is an exemplary user information table, for example, the user identifier U001 represents a user (user) of which a number is 001, D0001 represents a user equipment (device) of which a number is 0001, and for the user attribute, a location of a user and the gender of the user are taken as an example; exemplarily, a location of a user in a user attribute of a user of which a user identifier is U002 is Beijing, the gender is male, and user equipment identifiers corresponding to the user identifier U002 are D0003 and D0004. After the notification server establishes the user equipment identifier table, the user may maintain, through the user interface provided by the notification server, user information corresponding to the user and provided in table 1, and generally, the user equipment identifier is fixed, and other user information can be changed by the user.

Furthermore, during registration of the user, the notification server may obtain an application identifier corresponding to an application to be used by the user, and then establish the user identifier table according to the user identifier in the registration information.

The other kind is that, the user equipment performs information registration on an application server, and for a specific process, reference may be made to a common process of registration of the user equipment on the application server, which is not elaborated in the present invention. Because the user equipment performs information registration on the application server, the application server may maintain the user identifier table and the user equipment identifier table, and to enable the notification server to obtain corresponding user information, the application server may send the user identifier table and the user equipment identifier table to the notification server, where the user identifier table and the user equipment identifier table are used to screen the terminal state level table for a specific user equipment.

302. The user equipment A sends a state change notification to the notification server.

The user equipment may detect, in real time, whether a terminal state of the user equipment is changed, and send the state change notification to the notification server when the terminal state is changed, so that the notification server establishes the terminal state level table according to the state change notification, where the terminal state level table is used to indicate a level used by an application in the user equipment.

A standard of a change of the terminal state may be set as required. At least two terminal states detected by the user equipment exist: "being used by the user" and "not used by the user". In a practical application, the user equipment may detect an operation of the user on a terminal according to an SDK (Software Development Kit, software development kit) provided by a terminal operating system in the user equipment, which is used as the standard of a change of the terminal state, for example, what application is being used by the user and used by the user in what manner, whether lock-screen is changed to an unlocking state, whether a screen is clicked, whether a button is pressed, whether it is in a call state, and so on. It should be noted that, the user equipment may record a terminal state of the user equipment when the state change notification is sent last time, and trigger a report procedure only when the terminal state is changed.

Particularly, the state change notification includes: the user identifier, a terminal identifier, and a state identifier, where the user identifier is registered into the notification server in step 301, the terminal identifier is an identifier set according to a different terminal type, for example, an IMEI (International Mobile Equipment Identity, international mobile equipment identity), where the IMEI is formed by 15 digits, has one-one correspondence with each user equipment, and is unique all over the world, and the state identifier is used to identify the terminal state, and may specifically be a digit, a letter, a character string, or the like.

303. The notification server establishes the terminal state level table according to the state change notification.

The notification server establishes the terminal state level table according to the state change notification when receiving the state change notification for the first time. The notification server may directly update the established terminal state level table according to the state change notification when receiving the state change notification again. Particularly, the terminal state level table in the notification server may be a terminal state level table of one application, that is, the notification server maintains a service notification of only one kind of applications, or multiple terminal state level tables may exist in the notification server and correspond to multiple applications, that is, the notification server maintains service notifications of multiple kinds of applications.

It should be noted that, before step 302, a communication connection, for example, a TCP (Transmission Control Protocol, Transmission Control Protocol)-based long lasting connection, needs to be established between the notification server and the user equipment, so that both can send a message to each other. The communication connection may be used as an address of the user equipment and stored in the terminal state level table. Because of a different protocol adopted for the communication connection and a change of a communication link, the communication connection may be interrupted, and in this embodiment of the present invention, whether the communication connection is normal may be detected by using a heartbeat mechanism, and if the communication connection is abnormal, the connection may be reestablished. The heartbeat mechanism is that the user equipment periodically sends simple information to the notification server, so as to notify the notification server of the existence of the user equipment, that is, periodically sends a user-defined structure (heartbeat packet or heartbeat frame), so as to allow an opposite party to know that the user equipment is "online", thereby ensuring the validity of the connection.

The terminal state level table is used to indicate a level used by an application in each user equipment. The notification server may classify terminal states into different levels according to the state identifier, so as to establish the terminal state level table, and in the terminal state level table, each level represents a different activity degree of the user equipment. For example, the notification server classifies terminal states into levels 1 to 5 according to the state identifier. The level 5 represents that the terminal state of the user equipment is most active, for example, the user is using the application; the level 4 represents that the terminal state of the user equipment is less active than that in the level 5, for example, the user is using the device; the level 3 represents that the terminal state of the user equipment is less active than that in the level 4, for example, the user just switches the terminal state to not using; the level 2 represents that the terminal state of the user equipment is less active than that in the level 3, for example, the user does not use the terminal for a long time; however, heartbeats of the notification server and the user equipment still exist, and the user equipment may receive a pushed message; and the level 1 represents that the terminal state of the user equipment is lowest, for example, the heartbeats of the notification server and the user equipment do not exist, and the user equipment cannot receive a pushed message. Particularly, the terminal state level table further records a device address of each user equipment and update time of the terminal state, so that the notification server determines the reliability of the terminal state according to the update time, and when needing to send the service notification to the user equipment, may send the service notification according to the device address. As shown in table 2, for a user equipment of which a device identifier is D0001, a device address of the user equipment is connection 1, a terminal state of the user equipment is 5, and update time is 2012 Sep. 4 11:00:05; therefore, it can be seen that, at 2012 Sep. 4 11:00:05, the user is using the application.

TABLE 2

| Device Identifier | Device Address | Terminal State | Update Time |
| --- | --- | --- | --- |
| D0001 | Connection 1 | 5 | 2012/9/4 11:00:05 |
| D0002 | Connection 2 | 3 | 2012/9/4 11:00:05 |
| D0003 | Connection 3 | 2 | 2012/9/4 11:00:06 |

304. The application server sends a service message to the notification server.

The service message may include: the service notification, a first application identifier, a second user identifier, a user attribute, and so on. The second user identifier in the service message is used to indicate a target user that the service notification sent by the notification server would like to reach. At least one second user identifier exists.

305. The notification server screens, according to the service message, the terminal state level table for n user equipments of which a terminal state level is greater than or equal to a preset state level, as a target user equipment, where the n≥1.

The notification server obtains a terminal state level table of a corresponding application according to the first application identifier.

The process of screening the terminal state level table for the target user equipment by the notification server is relevant to content of the service message.

When the service message includes: the first application identifier and the second user identifier, the notification server may first screen the user equipment identifier table for all specific user equipments corresponding to the second user identifier, where the specific user equipment is a device on which the application is installed among a user equipment indicated by the second user identifier; and finally, screen the terminal state level table for n user equipments of which a terminal state level is greater than or equal to the preset state level among the specific user equipments, as the target user equipment. Exemplarily, it is assumed that second user identifiers are U001 and U002, and as shown in table 1, it is obtained through query according to the user identifier table and according to the user equipment identifier table that, user equipment identifiers corresponding to U001 are D0001 and D0002, and user equipment identifiers corresponding to U002 are D0003 and D0004, so that n user equipments of which a terminal state level is greater than or equal to the preset state level among the specific user equipments are obtained from the terminal state level table according to a preset rule, as the target user equipment. In this embodiment, it is assumed that the preset rule is obtaining n user equipments of which a terminal state level is greater than or equal to 3 among the specific user equipments, as the target user equipment. According to the terminal state level table shown in table 2, two user equipments, D0001 and D0002 that are greater than or equal to 3 are obtained as target user equipments.

When the service message includes: the first application identifier and the user attribute, the notification server may first screen the user identifier table for a user identifier corresponding to the first application identifier, then, screen a user indicated by the user identifier for a user satisfying the user attribute; then, screen, according to a first user identifier that corresponds to the user satisfying the user attribute, the user equipment identifier table for all specific user equipments corresponding to the first user identifier, where the specific user equipment is a device on which the application is installed among a user equipment indicated by the first user identifier, and finally, screen the terminal state level table for n user equipments of which a terminal state level is greater than or equal to the preset state level among the specific user equipments, as the target user equipment.

It should be noted that, when the service message includes: the first application identifier, the second user identifier, and the user attribute, because the second user identifier has clearly indicated the target user that the service notification would like to reach, the process of screening for a user according to the user attribute is not required, the notification server may correspondingly determine that a user attribute parameter is invalid, and reading of a corresponding parameter is not required. In this embodiment, it is assumed that the target user equipment includes the user equipment A.

306. The notification server sends the service notification to the target user equipment.

The notification server extracts the service notification from the service message obtained by the application server, and sends the service notification to the target user equipment. Specifically, the notification server may obtain a device address of the target user equipment from the terminal state level table, and then, send the service notification to the device address, where the service notification may include the first application identifier and notification content.

An operating system of the user equipment is set with a notification function, and when receiving the service notification, the operating system of the user equipment generates a system notification event, and presents the system notification event to the user, where the system notification event includes the service notification. It should be noted that, for the same user, the service notification may be received by multiple user equipments. Exemplarily, if a user B has 5 user equipments on which the same application is installed, the service notification may be received by 3 user equipments, and the 3 user equipments are user equipments of which a terminal state level is greater than or equal to the preset state level, and a probability that the user sees the service notification through the 3 user equipments is relatively high.

It should be noted that, in the method for pushing a notification that is provided in this embodiment of the present invention, an order of the steps may be properly adjusted, and a step may be correspondingly added or reduced as required, and any person skilled in the art can easily figure out a changed method within the technical scope disclosed in the present invention, which is not elaborated again.

Exemplarily, in this embodiment, it is assumed that the application server is a MicroBlog server, the user B has three user equipments, which are a mobile phone, a desktop computer, and a tablet computer, and a MicroBlog program is installed on each user equipment.

It should be noted that, when using the MicroBlog program for the first time, the user B needs to register a MicroBlog account, and in the registration process, the notification server may obtain a table of correspondence between a MicroBlog program identifier and a user identifier, and may also obtain the user equipment identifier table. The user may perform information registration on the notification server through a user equipment such as the mobile phone, and for a specific process, reference may be made to a common OAUTH protocol. In the registration process, the mobile phone may send registration information to the notification server, where the registration information includes: a user identifier and a user attribute, so that the notification server establishes a table of correspondence between a user identifier and a user equipment identifier of the mobile phone according to the user identifier, the user attribute, and an obtained user equipment identifier. Exemplarily, the user attribute may include the age of the user, a location of the user, a preference of the user, and so on. The notification server may provide a user interface in a form of a web page or the like for the user through the mobile phone, so that the user correspondingly fills the user attribute, and at the same time, the user may also set a user identifier thereof, for example, a user name formed by a character and a letter, and so on, on the user interface. Particularly, a user identifier may also be allocated by the notification server to each user, and user identifiers of various users are different. When the notification server receives the registration information sent by the user equipment, the notification server may further correspondingly obtain the user equipment identifier of the mobile phone. After the user registers the MicroBlog account, when the user logs in to a MicroBlog client, that is, runs the MicroBlog program, on each user equipment, account information is transferred to the notification server, where the account information includes the user equipment identifier. The notification server establishes a table of correspondence between the user identifier and a specific user equipment identifier according to the user identifier, the user attribute, and obtained user equipment identifiers of the mobile phone, the desktop computer, and the tablet computer.

The user B may also perform information registration on a MicroBlog server through the mobile phone, and for a specific process, reference may be made to a common process of registration of the user equipment on the MicroB log server, which is not elaborated in the present invention. Because the user B performs information registration on the MicroBlog server, a program server of the user B may maintain the user identifier table and the user equipment identifier table, and to enable the notification server to obtain corresponding user information, the application server may send the user identifier table and the user equipment identifier table to the notification server.

A user equipment of the user B, such as the mobile phone, may detect whether a terminal state of the user equipment is changed in real time, and send a state change notification to the notification server when the terminal state is changed, so that the notification server establishes the terminal state level table according to the state change notification. It is assumed that the terminal state level table is shown in table 2, a device identifier of the mobile phone is D0001, a device address of the mobile phone is connection 1, a terminal state of the user equipment is 5, and update time is 2012 Sep. 4, 11:00:05.

When information is updated in the MicroBlog program of the user B, for example, a new comment, the MicroBlog server sends a service message to the notification server, where the service message may include: a service notification, a first application identifier, a second user identifier, a user attribute, and so on, where the service notification carries content of the new comment. The notification server obtains, according to content in the service message, the terminal state level table shown in table 2, and it is assumed that, the preset state level is 5, so that a mobile phone of which a terminal state level is greater than or equal to the state level of 5 among the specific user equipments is obtained from the terminal state level table, as the target user equipment. Then, the service notification is sent to the mobile phone through connection 1.

According to the method for pushing a notification that is provided in this embodiment of the present invention, a notification server is added into an existing system for pushing a notification, and when receiving a service message, the notification server screens a terminal state level table for n user equipments of which a terminal state level is greater than or equal to a preset state level, as a target user equipment, that is, a use activity degree of an application in the target user equipment is relatively high, and sends a corresponding service notification to the target user equipment, so that a probability that a user sees the service notification in real time is increased, thereby increasing the flexibility of pushing a notification and improving user experience.

Figure 4:
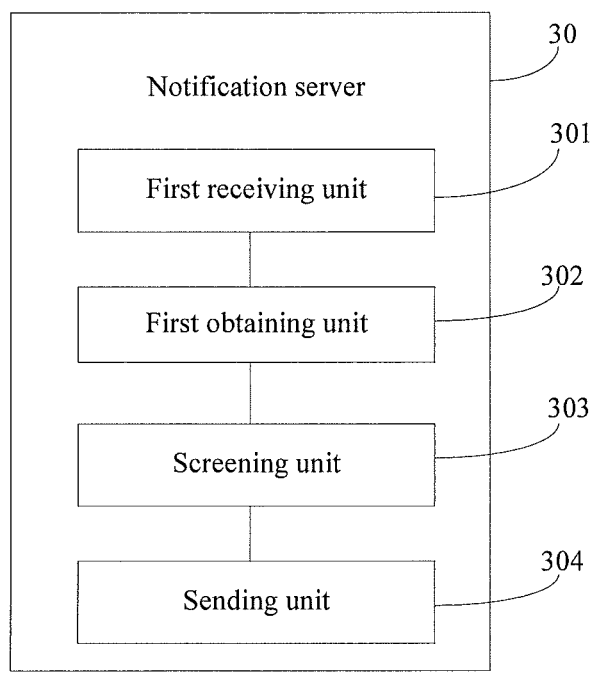
FIG. 4 is a schematic structural diagram of a notification server according to an embodiment of the present invention.

As shown in FIG. 4, an embodiment of the present invention provides a notification server 30, which includes:

a first receiving unit 301, configured to receive a service message sent by an application server, where the service message includes: a service notification, a user attribute, and a first application identifier, and send the service message to a first obtaining unit 302, a screening unit 303, and a sending unit 304;

the first obtaining unit 302, configured to receive the service message sent by the first receiving unit 301, obtain a terminal state level table according to the first application identifier and the user attribute, where the terminal state level table is used to indicate a level used by an application in each user equipment, and send the terminal state level table to the screening unit 302;

the screening unit 303, configured to receive the service message sent by the first receiving unit 301 and the terminal state level table sent by the first obtaining unit, screen, according to the service message, the terminal state level table for n user equipments of which a terminal state level is greater than or equal to a preset state level, as a target user equipment, where the n is an integer greater than or equal to 1, and send the target user equipment to the sending unit 304; and the sending unit 304, configured to receive the service message sent by the first receiving unit 301 and the target user equipment sent by the screening unit 303, and send the service notification to the target user equipment.

A notification server is added into an existing system for pushing a notification, and when a first receiving unit in the notification server receives a service message, a screening unit screens a terminal state level table for n user equipments of which a terminal state level is greater than or equal to a preset state level, as a target user equipment, that is, a use activity degree of an application in the target user equipment is relatively high, and a sending unit sends a corresponding service notification to the target user equipment, so that a probability that a user sees the service notification in real time is increased, thereby increasing the flexibility of pushing a notification and improving user experience.

Figure 5:
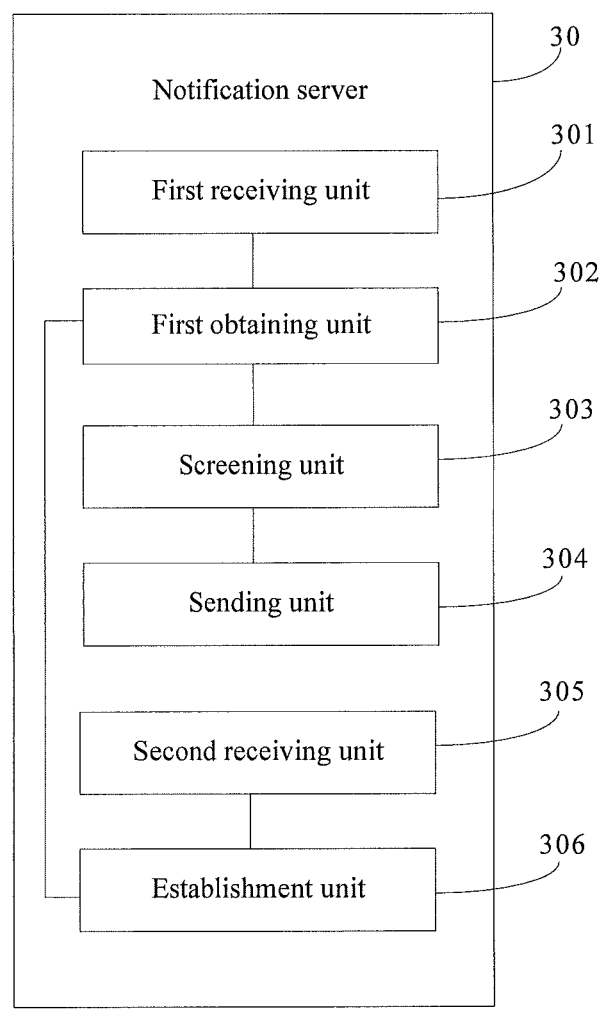
FIG. 5 is a schematic structural diagram of another notification server according to an embodiment of the present invention.

As shown in FIG. 5, the notification server 30 further includes:

a second receiving unit 305, configured to receive a state change notification sent by each user equipment; and an establishment unit 306, configured to establish the terminal state level table according to the state change notification.

The screening unit 303 is specifically configured to:

screen a user identifier table for a user identifier corresponding to the first application identifier; screen a user indicated by the user identifier for a user satisfying the user attribute; screen, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screen the terminal state level table for n user equipments of which a terminal state level is greater than or equal to the preset state level among the specific user equipments, as the target user equipment.

The service message further includes: a second user identifier; and the screening unit 303 is specifically configured to:

screen the user equipment identifier table for all specific user equipments corresponding to the second user identifier, where the specific user equipment is a device on which the application is installed among a user equipment indicated by the second user identifier; and screen the terminal state level table for n user equipments of which a terminal state level is greater than or equal to the preset state level among the specific user equipments, as the target user equipment.

Figure 6:
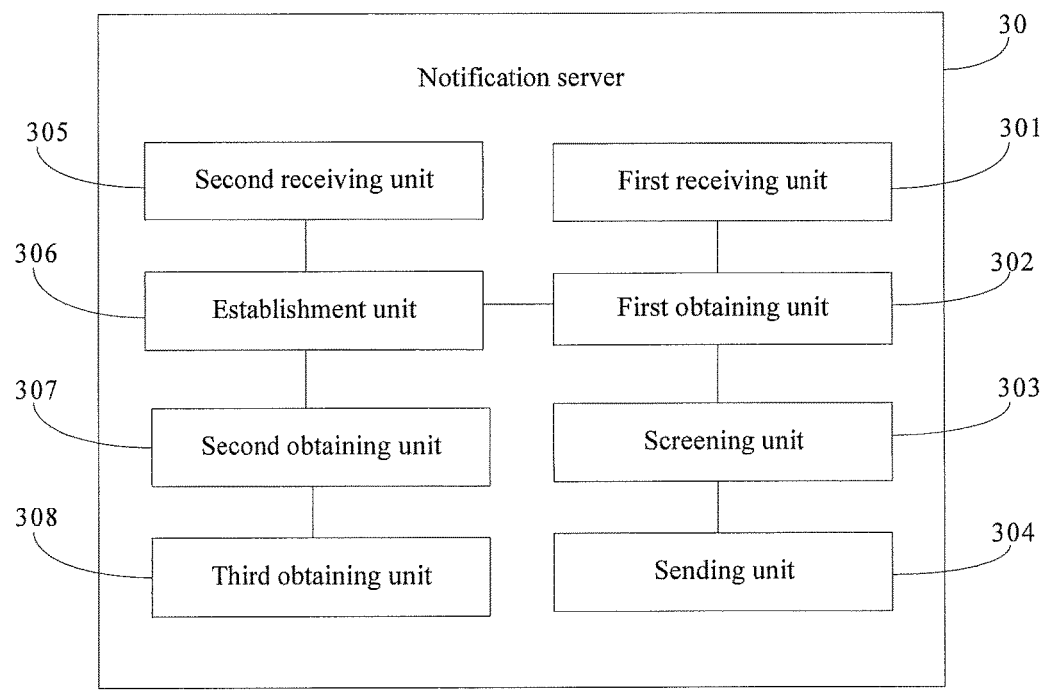
FIG. 6 is a schematic structural diagram of still another notification server according to an embodiment of the present invention.

Furthermore, as shown in FIG. 6, the notification server 30 further includes:

a second obtaining unit 307, configured to obtain the user identifier table, where the user identifier table records correspondence between an application identifier and a user identifier; and a third obtaining unit 308, configured to obtain the user equipment identifier table, where the user equipment identifier table records correspondence between a user identifier and a user equipment identifier, where the user identifier table and the user equipment identifier table are used to screen the terminal state level table for the specific user equipments.

The second obtaining unit 307 is specifically configured to:

receive the user identifier table sent by the application server.

The third obtaining unit 308 is specifically configured to:

receive the user equipment identifier table sent by the application server.

The third obtaining unit 308 may be further configured to:

receive registration information sent by each user equipment, where the registration information includes: a user identifier and a user attribute; obtain a user equipment identifier of the user equipment; and establish the user equipment identifier table according to the user identifier, the user attribute, and the user equipment identifier.

It may be clearly understood by a person skilled in the art that, for the purpose of convenient and brief description, for a specific step of each unit in the notification server described above, reference may be made to a corresponding process in the foregoing embodiments of the method for pushing a notification, and details are not described herein again.

According to the notification server provided in this embodiment of the present invention, when a first receiving unit in the notification server receives a service message, a screening unit screens a terminal state level table for n user equipments of which a terminal state level is greater than or equal to a preset state level, as a target user equipment, that is, a use activity degree of an application in the target user equipment is relatively high, and a sending unit sends a corresponding service notification to the target user equipment, so that a probability that a user sees the service notification in real time is increased, thereby increasing the flexibility of pushing a notification and improving user experience.

Figure 7:
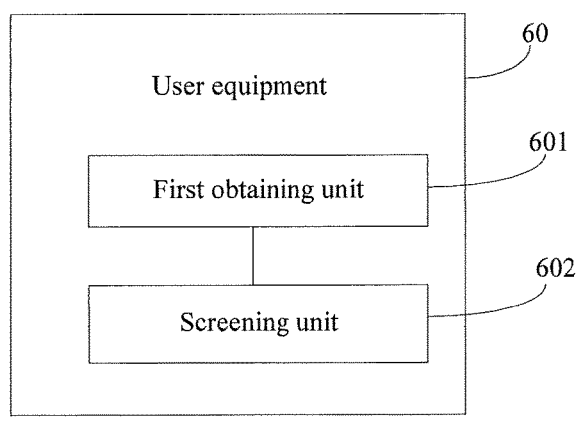
FIG. 7 is a schematic structural diagram of a user equipment according to an embodiment of the present invention.

As shown in FIG. 7, an embodiment of the present invention provides a user equipment 60, which includes:

a detection unit 601, configured to detect whether a terminal state of the user equipment is changed; and a first sending unit 602, configured to send a state change notification to a notification server when the detection unit 601 detects that the terminal state is changed, so that the notification server establishes a terminal state level table according to the state change notification, where the terminal state level table is used to indicate a level used by an application in the user equipment.

The detection unit in the user equipment checks the terminal state, and the first sending unit sends the state change notification to the notification server, so that the notification server can establish the terminal state level table according to the state change notification, and the notification server screens, according to a service message, the terminal state level table for n user equipments of which a terminal state level is greater than or equal to a preset state level, as a target user equipment; therefore, a use activity degree of an application in a user equipment receiving a service notification through a receiving unit is relatively high, and a probability that a user sees the service notification in real time is increased, thereby increasing the flexibility of pushing a notification and improving user experience.

Figure 8:
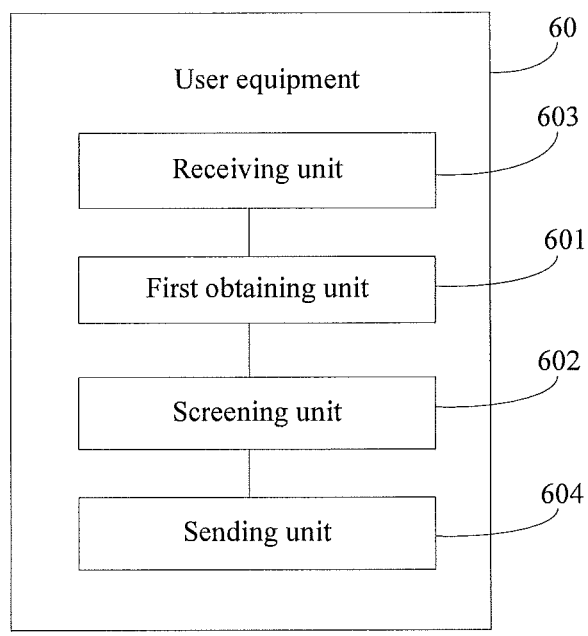
FIG. 8 is a schematic structural diagram of another user equipment according to an embodiment of the present invention.

Furthermore, as shown in FIG. 8, the user equipment 60 further includes:

a receiving unit 603, configured to receive a service notification sent by the notification server, where the service notification is sent by the notification server after screening, according to the service message, the terminal state level table for n user equipments of which a terminal state level is greater than or equal to a preset state level, as the target user equipment, where the n is an integer greater than or equal to 1; and a second sending unit 604, configured to send registration information to the notification server, where the registration information includes: a user identifier and a user attribute, so that the notification server establishes a user equipment identifier table according to the user identifier, the user attribute, and an obtained user equipment identifier.

It may be clearly understood by a person skilled in the art that, for the purpose of convenient and brief description, for a specific step of each unit in the user equipment described above, reference may be made to a corresponding process in the foregoing embodiments of the method for pushing a notification, and details are not described herein again.

According to the user equipment provided in this embodiment of the present invention, because a notification server screens, according to a service message, a terminal state level table for n user equipments of which a terminal state level is greater than or equal to a preset state level, as a target user equipment, a use activity degree of an application in a user equipment receiving a service notification through a receiving unit is relatively high, and a probability that a user sees the service notification in real time is increased, thereby increasing the flexibility of pushing a notification and improving user experience.

Figure 9:
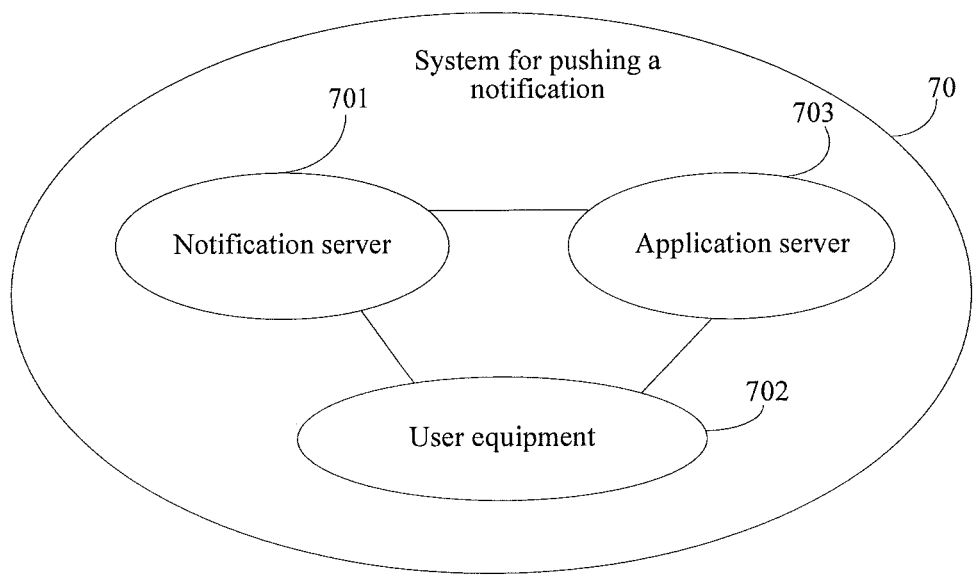
FIG. 9 is a schematic structural diagram of a system for pushing a notification according to an embodiment of the present invention.

As shown in FIG. 9, an embodiment of the present invention provides a system 70 for pushing a notification, which includes:

a notification server 701 according to any embodiment of the present invention, where the notification server 701 is configured to receive a service message sent by an application server 703, where the service message includes: a service notification, a user attribute, and a first application identifier; obtain a terminal state level table according to the first application identifier and the user attribute, where the terminal state level table is used to indicate a level used by an application in each user equipment; screen, according to the service message, the terminal state level table for n user equipments of which a terminal state level is greater than or equal to a preset state level, as a target user equipment, where the n is an integer greater than or equal to 1; and send the service notification to the target user equipment;

a user equipment 702 according to any embodiment of the present invention, where the user equipment 702 is configured to detect whether a terminal state of the user equipment is changed; and send a state change notification to the notification server 701 when the terminal state is changed, so that the notification server 701 establishes the terminal state level table according to the state change notification, where the terminal state level table is used to indicate a level used by an application in the user equipment; and the application server 703, configured to send the service message to the notification server 701.

According to the system for pushing a notification that is provided in this embodiment of the present invention, a notification server is added into an existing system for pushing a notification, and when receiving a service message, the notification server screens a terminal state level table for n user equipments of which a terminal state level is greater than or equal to a preset state level, as a target user equipment, that is, a use activity degree of an application in the target user equipment is relatively high, and sends a corresponding service notification to the target user equipment, so that a probability that a user sees the service notification in real time is increased, thereby increasing the flexibility of pushing a notification and improving user experience.

Figure 10:
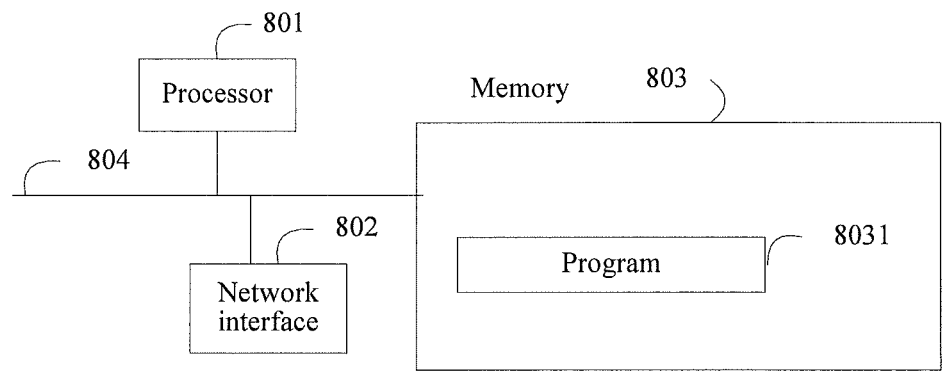
FIG. 10 illustrates a structure of a system gateway in a browser according to an embodiment of the present invention.

FIG. 10 illustrates a structure of a system gateway in a browser according to another embodiment of the present invention, which includes at least one processor 801 (such as a CPU), at least one network interface 802 or another communication interface, a memory 803, and at least one communication bus 804, configured to implement connection and communication between these apparatuses. The processor 801 is configured to execute an executable module stored in the memory 803, for example, a computer program. The memory 803 may include a high-speed random access memory (RAM: Random Access Memory), and may further include a non-volatile memory (non-volatile memory), for example, at least one disk memory. A communication connection between the system gateway in the browser and at least one another network element is implemented through the at least one network interface 802 (which may be wired or wireless), and the Internet, a wide area network, a local network, a metropolitan area network, and so on may be used.

In some implementation manners, the memory 803 stores a program 8031, where the program 8031 may be executed by the processor 801, and the program 8031 includes:

receiving a service message sent by an application server, where the service message includes: a service notification, a user attribute, and a first application identifier;

obtaining a terminal state level table according to the first application identifier and the user attribute, where the terminal state level table is used to indicate a level used by an application in each user equipment;

screening, according to the service message, the terminal state level table for n user equipments of which a terminal state level is greater than or equal to a preset state level, as a target user equipment, where the n is an integer greater than or equal to 1; and sending the service notification to the target user equipment.

Before the obtaining a terminal state level table according to the first application identifier and the user attribute, the method further includes:

receiving a state change notification sent by each user equipment; and establishing the terminal state level table according to the state change notification.

The screening, according to the service message, the terminal state level table for n user equipments of which a terminal state level is greater than or equal to a preset state level, as a target user equipment includes:

screening a user identifier table for a user identifier corresponding to the first application identifier;

screening a user indicated by the user identifier for a user satisfying the user attribute;

screening, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screening the terminal state level table for n user equipments of which a terminal state level is greater than or equal to the preset state level among the specific user equipments, as the target user equipment.

The service message further includes: a second user identifier; and the screening, according to the service message, the terminal state level table for n user equipments of which a terminal state level is greater than or equal to a preset state level, as a target user equipment includes:

screening a user equipment identifier table for all specific user equipments corresponding to the second user identifier, where the specific user equipment is a device on which the application is installed among a user equipment indicated by the second user identifier; and screening the terminal state level table for n user equipments of which a terminal state level is greater than or equal to the preset state level among the specific user equipments, as the target user equipment.

Before the screening, according to the service message, the terminal state level table for n user equipments of which a terminal state level is greater than or equal to a preset state level, as a target user equipment, the method further includes:

obtaining the user identifier table, where the user identifier table records correspondence between an application identifier and a user identifier; and obtaining the user equipment identifier table, where the user equipment identifier table records correspondence between a user identifier and a user equipment identifier, where the user identifier table and the user equipment identifier table are used to screen the terminal state level table for the specific user equipments.

The obtaining the user identifier table includes:
receiving the user identifier table sent by the application server; and the obtaining the user equipment identifier table includes:
receiving the user equipment identifier table sent by the application server.

The obtaining the user equipment identifier table includes:
receiving registration information sent by each user equipment, where the registration information includes: a user identifier and a user attribute;

obtaining a user equipment identifier of the user equipment; and establishing the user equipment identifier table according to the user identifier, the user attribute, and the user equipment identifier.

Figure 11:
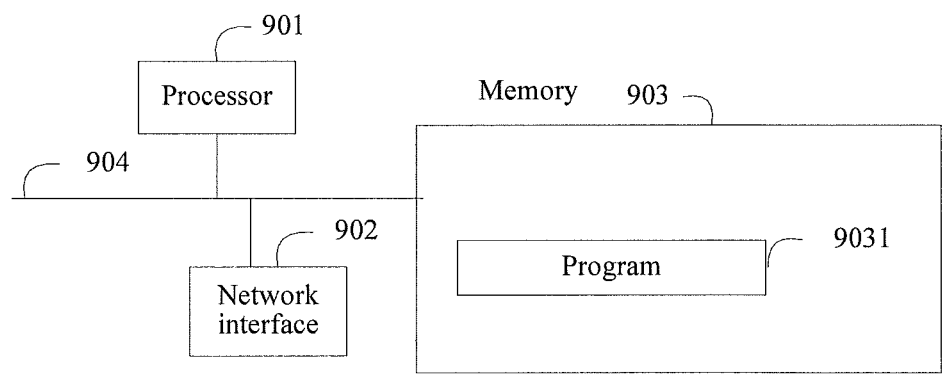
FIG. 11 illustrates a structure of a system gateway in another browser according to an embodiment of the present invention.

FIG. 11 illustrates a structure of a system gateway in a browser according to another embodiment of the present invention, which includes at least one processor 901 (such as a CPU), at least one network interface 902 or another communication interface, a memory 903, and at least one communication bus 904, configured to implement connection and communication between these apparatuses. The processor 901 is configured to execute an executable module stored in the memory 903, for example, a computer program. The memory 903 may include a high-speed random access memory (RAM: Random Access Memory), and may further include a non-volatile memory (non-volatile memory), for example, at least one disk memory. A communication connection between the system gateway in the browser and at least one another network element is implemented through the at least one network interface 902 (which may be wired or wireless), and the Internet, a wide area network, a local network, a metropolitan area network, and so on may be used.

In some implementation manners, the memory 903 stores a program 9031, where the program 9031 may be executed by the processor 901, and the program 9031 includes:

detecting whether a terminal state of a user equipment is changed;

sending a state change notification to a notification server when the terminal state is changed, so that the notification server establishes a terminal state level table according to the state change notification, where the terminal state level table is used to indicate a level used by an application in the user equipment.

The method further includes:
receiving a service notification sent by the notification server, where the service notification is sent by the notification server after screening, according to a service message, the terminal state level table for n user equipments of which a terminal state level is greater than or equal to a preset state level, as a target user equipment, where the n is an integer greater than or equal to 1.

The method further includes:
sending registration information to the notification server, where the registration information includes: a user identifier and a user attribute, so that the notification server establishes a user equipment identifier table according to the user identifier, the user attribute, and an obtained user equipment identifier.

Figure 12:
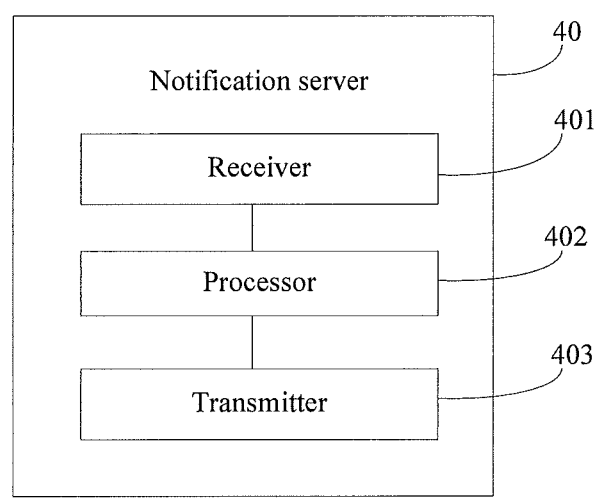
FIG. 12 is a schematic structural diagram of yet another notification server according to an embodiment of the present invention.

As shown in FIG. 12, an embodiment of the present invention provides a notification server 40, which includes:
a receiver 401, configured to receive a service message sent by an application server, where the service message includes: a service notification, a user attribute, and a first application identifier;

a processor 402, configured to obtain a terminal state level table according to the first application identifier and the user attribute, where the terminal state level table is used to indicate a level used by the application in each user equipment, where the processor 402 is further configured to screen, according to the service message, the terminal state level table for n user equipments of which a terminal state level is greater than or equal to a preset state level, as a target user equipment, where the n is an integer greater than or equal to 1; and a transmitter 403, configured to send the service notification to the target user equipment.

A notification server is added into an existing system for pushing a notification, and when a receiver in the notification server receives a service message, a processor screens a terminal state level table for n user equipments of which a terminal state level is greater than or equal to a preset state level, as a target user equipment, that is, a use activity degree of an application in the target user equipment is relatively high, and a transmitter sends a corresponding service notification to the target user equipment, so that a probability that a user sees the service notification in real time is increased, thereby increasing the flexibility of pushing a notification and improving user experience.

The receiver 401 is further configured to receive a state change notification sent by each user equipment; and the processor 402 is further configured to establish the terminal state level table according to the state change notification.

The processor 402 is specifically configured to:

screen a user identifier table for a user identifier corresponding to the first application identifier;

screen a user indicated by the user identifier for a user satisfying the user attribute;

screen, according to a first user identifier that corresponds to the user satisfying the user attribute, a user equipment identifier table for all specific user equipments corresponding to the first user identifier, where the specific user equipment is a device on which the application is installed among a user equipment indicated by the first user identifier; and screen the terminal state level table for n user equipments of which a terminal state level is greater than or equal to the preset state level among the specific user equipments, as the target user equipment.

The service message further includes: a second user identifier; and the processor 402 is specifically configured to:

screen a user equipment identifier table for all specific user equipments corresponding to the second user identifier, where the specific user equipment is a device on which the application is installed among a user equipment indicated by the second user identifier; and screen the terminal state level table for n user equipments of which a terminal state level is greater than or equal to the preset state level among the specific user equipments, as the target user equipment.

The receiver 401 is further configured to obtain the user identifier table, where the user identifier table records correspondence between an application identifier and a user identifier; and the receiver 401 is further configured to obtain the user equipment identifier table, where the user equipment identifier table records correspondence between a user identifier and a user equipment identifier, where the user identifier table and the user equipment identifier table are used to screen the terminal state level table for the specific user equipments.

The receiver 401 is specifically configured to:

receive the user identifier table sent by the application server; and receive the user equipment identifier table sent by the application server.

The receiver 401 is further configured to receive registration information sent by each user equipment, where the registration information includes: a user identifier and a user attribute; and the processor 402 is further configured to obtain a user equipment identifier of the user equipment, and establish the user equipment identifier table according to the user identifier, the user attribute, and the user equipment identifier.

Figure 13:
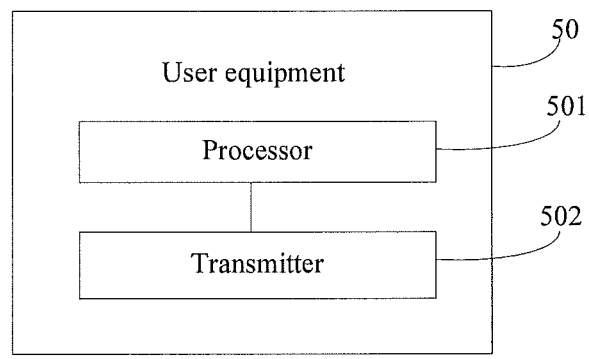
FIG. 13 is a schematic structural diagram of still another user equipment according to an embodiment of the present invention.

As shown in FIG. 13, an embodiment of the present invention provides a user equipment 50, which includes:

a processor 501, configured to detect whether a terminal state of the user equipment is changed; and a transmitter 502, configured to send a state change notification to a notification server when the terminal state is changed, so that the notification server establishes a terminal state level table according to the state change notification, where the terminal state level table is used to indicate a level used by an application in the user equipment.

The processor in the user equipment checks the terminal state, and the transmitter sends the state change notification to the notification server, so that the notification server can establish the terminal state level table according to the state change notification, and the notification server screens, according to a service message, the terminal state level table for n user equipments of which a terminal state level is greater than or equal to a preset state level, as a target user equipment; therefore, a use activity degree of an application in a user equipment receiving a service notification through a receiving unit is relatively high, and a probability that a user sees the service notification in real time is increased, thereby increasing the flexibility of pushing a notification and improving user experience.

Figure 14:
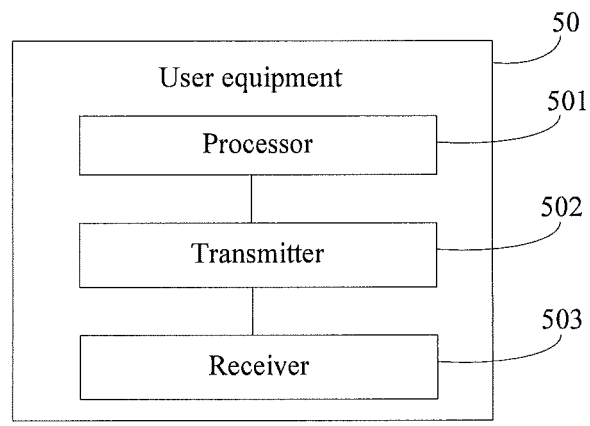
FIG. 14 is a schematic structural diagram of yet another user equipment according to an embodiment of the present invention.

Furthermore, as shown in FIG. 14, the user equipment 50 further includes:

a receiver 503, configured to receive a service notification sent by the notification server, where the service notification is sent by the notification server after screening, according to the service message, the terminal state level table for n user equipments of which a terminal state level is greater than or equal to a preset state level, as the target user equipment, where the n is an integer greater than or equal to 1.

The transmitter 502 is further configured to send registration information to the notification server, where the registration information includes: a user identifier and a user attribute, so that the notification server establishes a user equipment identifier table according to the user identifier, the user attribute, and an obtained user equipment identifier.

Figure 15:
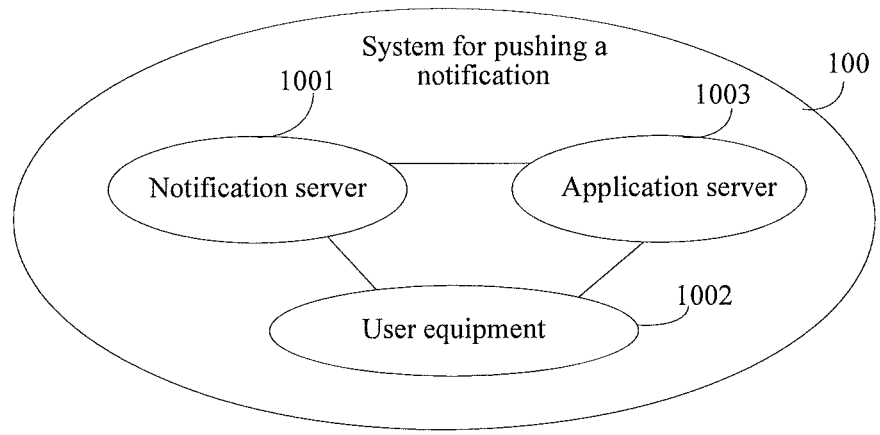
FIG. 15 is a schematic structural diagram of another system for pushing a notification according to an embodiment of the present invention.

As shown in FIG. 15, an embodiment of the present invention provides a system 100 for pushing a notification, which includes:

a notification server 1001 according to any embodiment of the present invention, where the notification server 1001 is configured to receive a service message sent by an application server 1003, where the service message includes: a service notification, a user attribute, and a first application identifier; obtain a terminal state level table according to the first application identifier and the user attribute, where the terminal state level table is used to indicate a level used by an application in each user equipment; screen, according to the service message, the terminal state level table for n user equipments of which a terminal state level is greater than or equal to a preset state level, as a target user equipment, where the n is an integer greater than or equal to 1; and send the service notification to the target user equipment;

a user equipment 1002 according to any embodiment of the present invention, where the user equipment 1002 is configured to detect whether a terminal state of the user equipment is changed; and send a state change notification to the notification server 1001 when the terminal state is changed, so that the notification server 1001 establishes the terminal state level table according to the state change notification, where the terminal state level table is used to indicate a level used by an application in the user equipment; and the application server 1003, configured to send the service message to the notification server 1001.

It may be clearly understood by persons skilled in the art that, for the purpose of convenient and brief description, for a specific working process of the foregoing systems, devices, and units, reference may be made to a corresponding process in the method embodiments, and details are not described herein again.

In the several embodiments provided in the present application, it should be understood that the disclosed system, apparatus, and method may be implemented in other manners. For example, the described apparatus embodiment is merely exemplary. For example, the module division is merely logical function division and may be other division in practical implementation. For example, a plurality of modules or components may be combined or integrated into another system, or some features may be ignored or not executed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, and may be located in one position, or may be distributed on a plurality of network modules. A part of or all of the modules may be selected according to the actual need to achieve the objectives of the solutions of the embodiments.

In addition, functional modules in the embodiments of the present invention may be integrated into one processing module, or each of the modules may exist alone physically, or two or more modules are integrated into one module. The integrated module may be implemented through hardware, or may also be implemented in a form of hardware plus a software functional module.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for pushing a notification, comprising:
by at least one server,
receiving a service message sent by an application server, wherein the service message comprises: a service notification, a user attribute of users of user equipments, and a first application identifier corresponding to an application;
obtaining a terminal state level table according to the first application identifier and the user attribute, wherein the terminal state level table indicates a level used by the application in at least two user equipment of the user equipments that are used, respectively, by at least two of the users corresponding to the user attribute;
screening, according to the service message, the terminal state level table to determine user equipment of the at least two user equipment of which a terminal state level is greater than or equal to a preset state level, and thereby determining, by the at least one server, each of the determined user equipment to be a target user equipment; and
sending the service notification to user equipment of the user equipment determined by the at least one server to be a target user equipment.

2. The method for pushing a notification according to claim 1, before the obtaining a terminal state level table, the method further comprising:
by the at least one server,
receiving state change notifications sent by the user equipments; and
establishing the terminal state level table according to the received state change notifications.

3. The method for pushing a notification according to claim 2, wherein
the screening comprises:
screening a user identifier table to determine users corresponding to the first application identifier;
screening the determined users to determine a user satisfying the user attribute;
screening, according to a first user identifier that corresponds to the determined user satisfying the user attribute, a user equipment identifier table to determine specific user equipment of the user equipments corresponding to the first user identifier, wherein each of the determined specific user equipment is a device on which the application is installed; and
screening the terminal state level table to determine user equipment of the determined specific user equipment of which a terminal state level is greater than or equal to the preset state level, and thereby determining, by the at least one server, each of the determined user equipment of the determined specific user equipment to be a target user equipment.

4. The method for pushing a notification according to claim 2, wherein
the service message further comprises: a user identifier; and
the screening comprises:
screening a user equipment identifier table to determine specific user equipment of the user equipments corresponding to the user identifier, wherein each of the determined specific user equipment is a device on which the application is installed; and
screening the terminal state level table to determine user equipment of the determined specific user equipment of which a terminal state level is greater than or equal to the preset state level, and thereby determining, by the at least one server, each of the determined user equipment of the determined specific user equipment to be a target user equipment.

5. The method for pushing a notification according to claim 3, wherein before the screening the terminal state level table to determine user equipment of the determined specific user equipment of which a terminal state level is greater than or equal to a preset state level, the method further comprising:
by the at least one server:
obtaining the user identifier table, wherein the user identifier table indicates correspondence between the application and the users; and
obtaining the user equipment identifier table, wherein the user equipment identifier table indicates correspondence between the users and the user equipments.

6. The method for pushing a notification according to claim 5, wherein
the obtaining the user identifier table comprises:
receiving, by the at least one server, the user identifier table sent to the at least one server by the application server; and
the obtaining the user equipment identifier table comprises:
receiving, by the at least one server, the user equipment identifier table sent to the at least one server by the application server.

7. The method for pushing a notification according to claim 5, wherein
the obtaining the user equipment identifier table comprises:
receiving, by the at least one server, registration information sent by respective user equipment of the user equipments, wherein the registration information comprises: a respective user identifier and a respective user attribute of the respective user equipment;
obtaining, by the at least one server, user equipment identifiers of the user equipments, respectively; and
establishing, by the at least one server, the user equipment identifier table according to the received registration information and the obtained equipment identifiers.

8. A notification server, comprising:
a receiver, configured to receive a service message sent by an application server, wherein the service message comprises: a service notification, a user attribute of users of user equipments, and a first application identifier corresponding to an application;
a processor, configured to obtain a terminal state level table according to the first application identifier and the user attribute, wherein the terminal state level table indicates a level used by the application in at least two user equipment of the user equipments that are used, respectively, by at least two of the users corresponding to the user attribute, wherein
the processor is further configured to screen, according to the service message, the terminal state level table to determine user equipment of the user equipments of which a terminal state level is greater than or equal to a preset state level, and thereby determine, by the processor, each of the determined user equipment to be a target user equipment; and
a transmitter, configured to send the service notification to user equipment of the user equipment determined by the processor to be a target user equipment.

9. The notification server according to claim 8, wherein
the receiver is further configured to receive state change notifications sent by the user equipments; and the processor is further configured to establish the terminal state level table according to the received state change notifications.

10. The notification server according to claim 9, wherein the processor is specifically configured to:
screen a user identifier table to determine users corresponding to the first application identifier;
screen the determined users to determine a user satisfying the user attribute;
screen, according to a first user identifier that corresponds to the determined user satisfying the user attribute, a user equipment identifier table to determine specific user equipment of the user equipments corresponding to the first user identifier, wherein each of the determined specific user equipment is a device on which the application is installed; and
screen the terminal state level table to determine user equipment of the determined specific user equipment of which a terminal state level is greater than or equal to the preset state level, and thereby determine, by the processor, each of the determined user equipment of the determined specific user equipment to be a target user equipment.

11. The notification server according to claim 9, wherein the service message further comprises: a user identifier; and the processor is specifically configured to:
screen a user equipment identifier table to determine specific user equipment of the user equipments corresponding to the user identifier, wherein each of the determined specific user equipment is a device on which the application is installed; and
screen the terminal state level table to determine user equipment of the determined specific user equipment of which a terminal state level is greater than or equal to the preset state level, and thereby determine, by the processor, each of the determined user equipment of the determined specific user equipment to be a target user equipment.

12. The notification server according to claim 10, wherein
the receiver is further configured to obtain the user identifier table, wherein the user identifier table indicates correspondence between the application and the users; and
the receiver is further configured to obtain the user equipment identifier table, wherein the user equipment identifier table indicates correspondence between the users and the user equipments.

13. The notification server according to claim 12, wherein the receiver is specifically configured to:
receive the user identifier table sent to the notification server by the application server; and
receive the user equipment identifier table sent to the notification server by the application server.

14. The notification server according to claim 12, wherein
the receiver is further configured to receive registration information sent by respective user equipment of the user equipments, wherein the registration information comprises: a respective user identifier and a respective user attribute of the respective user equipment; and
the processor is further configured to obtain user equipment identifiers of the user equipments, respectively, and establish the user equipment identifier table according to the received registration information and the obtained equipment identifiers.

15. A system for pushing a notification, comprising:
an application server configured to send a service message;

a notification server, comprising: a receiver, configured to receive the service message sent by the application server, wherein the service message comprises: a service notification, a user attribute of users of user equipments, and a first application identifier corresponding to an application; a processor, configured to obtain a terminal state level table according to the first application identifier and the user attribute, wherein the terminal state level table indicates a level used by the application in at least two user equipment of the user equipments that are used by at least two of the users, respectively, corresponding to the user attribute, wherein the processor is further configured to screen, according to the service message, the terminal state level table to determine user equipment of the user equipments of which a terminal state level is greater than or equal to a preset state level, and thereby determine, by the processor, each of the determined user equipment to be a target user equipment, and a transmitter, configured to send the service notification to user equipment of the user equipment determined by the processor to be a target user equipment; and a respective user equipment, comprising: a processor, configured to detect whether a terminal state of the respective user equipment is changed, and a transmitter, configured to send a state change notification to the notification server when the respective user equipment detects that the terminal state is changed, so that the notification server establishes the terminal state level table according to the state change notification.

16. A method comprising:

by at least one server:

receiving notifications sent by a plurality of user equipments used by a plurality of users, the notifications indicating changes in state levels used by an application in the plurality of user equipments;

maintaining, in accordance with received notifications, a state level table indicating state levels used by the application in the plurality of user equipments;

receiving a service message from an application server, the service message including a service notification, a user attribute and an identifier identifying the application;

screening the maintained state level table to determine user equipments of the plurality of user equipments having a state level greater than or equal to a specific state level and that are used by users, of the plurality of users, that correspond to the user attribute in the received service message; and sending the service notification to each of the determined user equipments.

17. An apparatus comprising:

at least one memory storing instructions; and at least one processor that executes the stored instructions to cause the following to be performed:

receiving notifications sent by a plurality of user equipments used by a plurality of users, the notifications indicating changes in state levels used by an application in the plurality of user equipments;

maintaining, in accordance with received notifications, a state level table indicating state levels used by the application in the plurality of user equipments;

receiving a service message from an application server, the service message including a service notification, a user attribute and an identifier identifying the application;

screening the maintained state level table to determine user equipments of the plurality of user equipments having a state level greater than or equal to a specific state level and that are used by users, of the plurality of users, that correspond to the user attribute in the received service message; and sending the service notification to each of the determined user equipments.

* * * * *